US00RE40720E

(19) United States
(12) Reissued Patent
Buchanan et al.

(10) Patent Number: US RE40,720 E
(45) Date of Reissued Patent: Jun. 9, 2009

(54) FABRIC SUPPORT ELEMENT FOR A PAPERMAKING MACHINE

(75) Inventors: John G. Buchanan, Ottawa (CA); Richard E. Pitt, Almonte (CA); Roy Van Essen, North Gower (CA); Karl Lemme, Blanford, MA (US); Vaughn Wildfong, East Longmeadow, MA (US)

(73) Assignee: AstenJohnson, Inc., Charleston, SC (US)

(21) Appl. No.: 11/934,097
(22) Filed: Nov. 2, 2007

Related U.S. Patent Documents

Reissue of:
(64) Patent No.: 7,005,040
Issued: Feb. 28, 2006
Appl. No.: 10/383,687
Filed: Mar. 10, 2003

U.S. Applications:
(63) Continuation-in-part of application No. 09/942,649, filed on Aug. 31, 2001, now abandoned.

(30) Foreign Application Priority Data

Sep. 5, 2000 (GB) ..... 0021767

(51) Int. Cl.
*D21F 9/02* (2006.01)
*D21F 1/48* (2006.01)

(52) U.S. Cl. ..... 162/352; 162/315; 162/351; 162/374

(58) Field of Classification Search ..... 162/211, 162/217, 252, 300, 301, 315, 336, 348, 351, 162/352, 354–356, 363, 374, 203
See application file for complete search history.

(56) References Cited

U.S. PATENT DOCUMENTS

| | | | | | |
|---|---|---|---|---|---|
| 2,928,465 | A | * | 3/1960 | Wrist | 162/352 |
| 3,220,920 | A | * | 11/1965 | Truxa | 162/352 |
| 3,438,854 | A | * | 4/1969 | Means | 162/303 |
| 3,598,694 | A | * | 8/1971 | Wiebe | 162/351 |
| RE29,417 | E | * | 9/1977 | Lee et al. | 162/274 |
| 4,123,322 | A | * | 10/1978 | Hoult | 162/352 |
| 4,209,360 | A | * | 6/1980 | Stenberg et al. | 162/203 |
| 4,425,188 | A | * | 1/1984 | Fujiwara | 162/300 |
| 4,425,189 | A | * | 1/1984 | Mimura | 162/352 |
| 4,718,983 | A | * | 1/1988 | Ibrahim | 162/252 |
| 4,734,164 | A | * | 3/1988 | Irwin et al. | 162/348 |
| 4,802,954 | A | * | 2/1989 | Malashenko | 162/348 |
| 5,076,894 | A | * | 12/1991 | Simmons et al. | 162/352 |
| 5,080,760 | A | * | 1/1992 | Smith et al. | 162/351 |
| 5,084,138 | A | * | 1/1992 | Ewald | 162/300 |
| 5,160,583 | A | * | 11/1992 | Eaton et al. | 162/301 |
| 5,582,688 | A | * | 12/1996 | Bando et al. | 162/301 |
| 5,667,640 | A | * | 9/1997 | Wanke | 162/203 |
| 5,718,805 | A | * | 2/1998 | Egelhof et al. | 162/301 |
| 5,730,841 | A | * | 3/1998 | Wanke | 162/203 |
| 5,922,173 | A | * | 7/1999 | Neun et al. | 162/352 |
| 5,932,072 | A | * | 8/1999 | Neun et al. | 162/352 |
| 6,030,501 | A | * | 2/2000 | Neun et al. | 162/352 |
| 6,372,091 | B2 | * | 4/2002 | Wildfong et al. | 162/301 |
| 2003/0037898 | A1 | * | 2/2003 | Masuda et al. | 162/352 |

FOREIGN PATENT DOCUMENTS

| | | | |
|---|---|---|---|
| EP | 1 288 368 | * | 5/2003 |
| GB | 2 082 644 | * | 3/1982 |
| JP | 4-370288 | * | 12/1992 |
| WO | WO 00/79041 | * | 12/2000 |
| WO | WO 02/20899 | * | 3/2002 |

* cited by examiner

*Primary Examiner*—Eric Hug
(74) *Attorney, Agent, or Firm*—Volpe and Koenig, P.C.

(57) ABSTRACT

A fabric support element for a papermaking machine has improved fluid drainage means, comprising openings which can include flow-through vents. The element can comprise an impingement shoe for a forming section of a papermaking machine. The opening can be defined by a plurality of laminar segments, at least some of which define a paper side surface of the element, and which segments can be spaced apart by additional laminar segments or other spacing means. Laminar segments for use in the element, a method of constructing the element, and a papermaking machine, or a forming section thereof, including the element are also provided.

36 Claims, 5 Drawing Sheets

FABRIC SUPPORT ELEMENT FOR A PAPERMAKING MACHINE

Matter enclosed in heavy brackets [ ] appears in the original patent but forms no part of this reissue specification; matter printed in italics indicates the additions made by reissue.

This application is a continuation-in-part application of U.S. application Ser. No. 09/942,649 filed Aug. 31, 2002, now abandoned.

FIELD OF THE INVENTION

This invention concerns a fabric support element for use in a papermaking machine, a segment for use in the element, a method of making the element and a papermaking machine, or a forming section thereof, in which it is used.

BACKGROUND OF THE INVENTION

In the initial portion of the forming section of a papermaking machine, an unsupported jet of highly aqueous stock is ejected from the head box slice onto the surface of a moving forming fabric. The unsupported jet will typically traverse a distance of from about 6 cm to about 40 cm before impinging the surface of the forming fabric at the point of impingement. The angle of impingement, $\alpha$, formed between the stock jet and the plane of the forming fabric at the point of impingement has typically been from about 4° to about 10°. It is well known that improved paper formation can be obtained by minimizing both the angle $\alpha$ and the length of the unsupported free jet. As the angle $\alpha$ increases, the magnitude of the pressure exerted by the jet on the surface of the forming fabric also increases.

Impingement angles greater than about 5° have generally been found to create peak impingement pressures that may cause sheet marking, low retention of papermaking fines and fillers, and plugging of the forming fabric. Therefore, the angle $\alpha$ should be made as small as possible so that, ideally, the unsupported stock jet impinges on the fabric substantially tangentially.

As the unsupported length of the free stock jet increases, its outside surface begins to break up into ridges and furrows, which will eventually cause sheet basic weight variations. Further, finely dispersed fibers in the stock start to reflocculate rapidly in the unsupported jet prior to the point of impingement. Therefore, the unsupported stock jet should be made as short as possible to minimize these effects.

Due to the competing space requirements of both the head box slice lip structure and the adjacent upstream rolls such as a breast roll or forming roll, it is difficult to shorten the unsupported stock jet length without increasing the angle $\alpha$. Even if the head box slice lips can be located so that the angle $\alpha$ is very small, and the free jet is nearly tangential to the forming fabric, air that is trapped in the small wedge shaped space between the surface of the forming fabric and the surface of the unsupported stock jet becomes entrained into the stock, forming bubbles which are detrimental to sheet formation.

Several proposals have been made to overcome these difficulties. Nelson et al, U.S. Pat. No. 3,440,136 discloses a method of avoiding air entrainment by evacuating the air from the forming zone, and flooding this area with water. However this proposal has been found to be difficult to realize in practice. Irwin et al., U.S. Pat. No. 4,734,164, disclose a forming board for a single fabric machine in which the first blade is slightly curved to permit the breast roll to be lowered slightly. The difficultly with this proposal is that air is trapped in the shallow wedge space between the jet and the forming fabric as it passes over the unvented, solid surface of the curved first blade. This air is forced into the stock as bubbles which cause formation defects. Malashenko, U.S. Pat. No. 4,802,954, discloses a lead-in blade located ahead of the curved blade element proposed by Irwin et al., which is said to reduce the amount of fluid pumped by the forming fabric into the wedge shaped space between the jet and the fabric. However, a small wedge shaped air space remains. The pressure in this space is controlled by a vacuum pump to reduce the jet disturbance. Ewald in U.S. Pat. No. 5,084,138 addresses the problem of excessive free jet length by using curved turning bars to replace large diameter breast rolls and a solid curved blade, but does not avoid air entrapment at the wedge between the jet and the fabric.

Fujiwara in U.S. Pat. No. 4,425,188 uses longitudinal spaced grooves in a twin wire forming shoe to generate cross-directional flows to realign the fibers in the incipient web so as to reduce machine direction fiber alignment. Wildfong et al., in U.S. Pat. No. 6,372,091, addresses the improved removal of water by the use of grooves in the face of a forming shoe.

However, although it is known that grooving the forming shoe, also known as an impingement shoe, may provide quality improvements in the resulting paper, it has been found that there are problems associated with the use of such grooves. Firstly, the grooves have been found to fill quickly with stock and thus substantially lose their advantageous effect, because there is no positive means to remove quickly the drained fluid from the fabric contact surface. Secondly, it has been found that the grooves may create a foiling effect between the machine side of the fabric and the groove interior, creating a level of suction sufficient to cause a deterioration in paper quality. Thirdly, it is difficult, time consuming and thus costly to create precisely dimensioned grooves in the typical ceramic surfaces of these blades, and the integrity of the ceramic can be compromised by the machining process.

The following terms have the meaning indicated below. Other terms used herein have the meanings normally associated with them in the papermaking industry.

Cross-machine direction (CD) is a direction essentially within the plane of the paper sheet and substantially perpendicular to the machine direction (MD).

Downstream is a direction in the papermaking machine essentially facing towards the reel where the finished paper product exits the machine.

Fabric support element is any stationary element in a papermaking machine over which at least one of the papermaking machine fabrics passes in sliding contact, including, but not limited to, shoes, blades, foils and agitators in the forming section, and Uhle box covers in the press section.

Laminar segments are relatively thin components, having a thickness ranging from about 1 mm (0.04 inch) or less to about 254 mm (1 inch) or more which may be assembled in a side-by-side relation in order to build up a fabric support element of a desired width. Laminar segments are typically formed of ceramic or other abrasion resistant materials.

Machine direction (MD) is a direction in the papermaking machine substantially parallel to the overall direction of travel of a paper sheet.

Machine side (MS) surface is the side of a fabric or fabric support element which is opposite to the paper side surface and is not in contact with the paper sheet.

Paper side (PS) surface is the side of a fabric or fabric support element which is either in contact with, or facing, the paper sheet being made on and conveyed through the papermakkng machine.

Upstream is a direction in the papermaking machine which is essentially facing towards the headbox.

Vented describes the presence of open passageways which pass from the paper side surface through to the machine side surface of a support element, i.e. from the fabric contacting side through to the opposite side, the passageways being referred to herein as flow-through vents.

It has now been found that some of these aforementioned difficulties can be completely or substantially eliminated by the use of vents, which pass completely through the impingement shoe and thus enable the effective removal of sufficient fluid so as to prevent filling of the grooves. These flow-through vents are open from the paper side surface through to the machine side surface of the impingement shoe, and enable the removal of a greater amount of fluid, together with air which would otherwise be entrapped between the forming fabric and the stock jet, from the zone of initial impingement on the impingement shoe than has previously been possible with grooved surfaces such as defined by Wildfong et al. in U.S. Pat. No. 6,372,091.

It has further been found that these flow-through vents allow for significant variations to both the angle of impingement of the stock jet and the resultant position of the point of impingement, without any appreciable adverse effect on the resultant paper quality. This result is very surprising since, previously, variations in the angle of impingement of the stock jet by as little as one-half of one degree from an optimum value could produce significant deleterious effects on sheet quality with respect to sheet marking, retention and formation. The present invention thus allows a broader range in the angle of impingement of the stock jet than has previously been practicable.

It has also been found that these flow-through vents can be provided most advantageously by constructing the impingement shoe from a plurality of relatively thin laminar segments which are mounted together on a suitable retaining means in the papermaking machine so as to be essentially parallel to and in contact with one another and oriented at a substantially constant angle to the machine direction (MD). These laminar segments are preferably shaped from a suitable material, such as a ceramic, so as to have a machine side surface which is adapted to be mounted on a retaining means, a paper side surface which in use faces the forming fabric, an upstream surface (or leading edge) and a downstream surface (or trailing edge) and substantially parallel lateral mating surfaces facing the cross-machine direction (CD) in use. The PS surfaces of at least a first set of the segments together define a fabric contact surface of the impingement shoe which is intended to support the forming fabric. The surface may have any desired profile which would be suitable for the prevailing paper making requirements. A second set of segments, whose PS surface profile may be different from that of the first set, may be located at suitable intervals in the CD between pairs of first segments. Preferably, the second set of segments are shaped so as to form openings in the fabric contact surface of the element and enable the definition of vents which will be open from the PS surface through the MS surface. Alternatively, spacing means can be integrally constructed on one or both of the lateral CD surfaces of the first set of segments only, in which case the impingement shoe will generally be comprised of only such first segments. It has been found that the spacing means, either integrally constructed with the first set of segments, or comprising second segments, can have a suitable configuration to optimize the removal of fluid and entrapped air from the stock jet.

It has also been determined that it is possible to assemble a segmented fabric support element intended for use in any section of a papermaking machine using a plurality of at least first and second laminar segments that are shaped so as to be mounted on a suitable retaining means and located as required in any of the forming section, press or dryer sections of a papermaking machine. These first and second laminar segments are mounted on known retaining means so as to be essentially parallel to and in contact with one another and are oriented substantially in the MD or at a constant angle thereto. The construction and configuration of the segments are substantially as described above in relation to an impingement shoe, with the PS surfaces of at least the first segments together defining a fabric contact surface which is intended to support a papermaking fabric. The PS surfaces of at least the first and second segments are shaped so as to provide the PS surfacer of the element with any desired profile when assembled which would be suitable for the prevailing paper making conditions. The second set of segments can be located as either spacing or profiling means at suitable intervals in the CD between selected pairs of first segments to enable the definition of openings, which may, but do not necessarily, include vents which will be open from the PS surface though the MS surface of the element. The PS surface of the second and first segments can be shaped so as to provide the assembled element with either or both a desired MD and CD profile. Third or fourth segments, or more, can also be used in a like manner in combination with the first and second segments.

The present invention seeks to provide a vented impingement shoe for use in a papermaking machine, having a plurality of flow-through vents extending from a profiled upper surface and through the lower surface of the impingement shoe.

The present invention seeks to provide a segmented fabric support element for use in the impingement zone of the forming section of a high speed paper making machine, which element is comprised of a plurality of laminar segments. The PS surfaces of the segments are shaped so as to contribute to the overall desired profile of the fabric contacting surface or PS of the element, and vents through the element, if desired, are defined by openings between selected laminar segments.

Thus, an impingement shoe constructed according to the invention performs four principal functions. Firstly, it serves to support the forming fabric as it enters the impingement zone, and secondly it serves to vent at least a substantial proportion of any air which becomes trapped in the wedge shaped space between the surface of the forming fabric and the surface of the stock jet. Thirdly, it permits drained water to be removed efficiently and speedily, and fourthly it provides a previously unattainable tolerance in the location of the point of impingement and the angle of impingement.

Further, the present invention seeks to provide a stationary fabric support element for a papermaking machine, which element is comprised of a plurality of at least first and second relatively thin laminar segments.

Further, the present invention seeks to provide segments for use in an impingement shoe or other stationary fabric support element, such that the PS surfaces of at least some of the segments contribute to a profiled fabric contact surface of the element, and vents through the element can be defined by openings between at least some of the segments. The segments are shaped so that the fabric support element can be mounted in a releasably secure manner in a suitable retaining means.

Still further, the invention seeks to provide a forming section for a papermaking machine, which forming section includes a segmented fabric support element including flow-through vents as an impingement shoe.

Still further, the invention seeks to provide a method of making such an element assembled from a plurality of segments.

SUMMARY OF THE INVENTION

Thus in a first broad embodiment the present invention seeks to provide a vented segmented fabric support element for use as an impingement shoe in the initial impingement zone of the forming section of a papermaking machine.

The impingement shoe is comprised of a plurality of laminar segments which are constructed and arranged on a common support means so as to be releasably secured in substantially parallel, contacting relation to one another, and so that the forming fabric moves in sliding contact over a common PS fabric contacting surface of the segments.

In one alternative construction of the impingement shoe, the laminar segment are identical in shape and can include spacing means, which may be, but are not necessarily, constructed integrally therewith.

In a second alternative construction, the impingement shoe is comprised of at least first and second laminar segments wherein the first segments contribute to the PS fabric contacting surface and the second segments do not, but instead are located between any two segments or between groups of two or more segments. The second segments are shaped so as to form vents between two adjacent segments and, if desired, additional openings on the PS surface of the element; these vents are open from the PS surface through to the MS surface of the impingement shoe and allow for the passage of fluid and entrained air from the stock jet through the forming fabric. Optionally, this venting can be segmented by vacuum means connected to the underside of the impingement shoe. Advantageously, the second segments can be hydrodynamically shaped so as to assist with the removal of large volumes of fluid moving at relatively high speeds. The second segments generally separate a portion of the first segments so as to form openings on the fabric contacting surface of the impingement shoe. These openings can be oriented at any desired angle to the MD, by suitably shaping the laminar segments. Preferably, these openings will be slot-shaped and oriented at an angle of from about 2 to about 20 degrees to the MD. Both the vents and openings will be oriented at the same angle to the MD by virtue of the construction of the impingement shoe.

In a third alternative construction, third segments are provided and located as required between selected first and second segments, the PS surface of the third segments having a suitable profile for the intended application.

The releasably secure mounting of the segments can be effected by various known means, such as a T-slot or dovetail mount. Alternatively or additionally, the segments can be provided with openings through which a rod or cable can be threaded, for example as disclosed in Lee et al., in U.S. Pat. No. 3,871,953, for a plurality of identical segments. The rod or cable can thus be secured by known means to suitable end blocks located at the sides of the forming section.

Thus the invention seeks to provide a vented impingement shoe, for use in a papermaking machine, located adjacent to a point of impingement of a stock jet ejected from a head box slice onto a moving forming fabric, the impingement shoe having (i) a leading edge located upstream of the point of impingement;

(ii) a trailing edge;

(iii) a machine side surface adapted to be releasably secured by a securing means to the papermaking machine; and (iv) a paper side surface, having predetermined cross-machine direction and machine direction profiles adapted to support the forming fabric in sliding contact; wherein the paper side surface includes a plurality of vents which begin substantially adjacent to the leading edge and end substantially adjacent to the trailing edge, and extend from the paper side surface and through the machine side surface of the impingement shoe.

Preferably, the profiled PS surface of the impingement shoe, between the leading and trailing edges, is essentially generally convex, but can be of any suitable configuration for the particular circumstances. This can include an essentially circular convexly curved surface, with a constant radius, or a surface having a radius of curvature which increases towards the trailing edge, so that the shaped trailing edge portion may be essentially flat. When intended for use in other areas of the papermaking machine, i.e. other than as an impingement shoe, the PS surface can be flat, grooved or otherwise profiled. Such choice will be dependent on the papermaking conditions at the intended area of use.

In a second board embodiment, the present invention seeks to provide a forming section of a papermaking machine having a machine direction and a cross-machine direction, which includes:

at least one forming fabric which moves in the machine direction;

a head box including a head box slice which provides a jet of paper making stock which impinges at an angle of impingement onto a first forming fabric at a point of impingement;

a roll, about which the first forming fabric passes, and which is located upstream of the head box slice;

a forming section, located downstream of the point of impingement, including static support elements which define a fabric path through which each forming fabric passes;

wherein at least one forming fabric is provided with a vented impingement shoe, located adjacent to the respective points at which the stock contacts each forming fabric, each impingement shoe having (i) a leading edge;

(ii) a trailing edge;

(iii) a machine side surface adapted to be releasably secured by a securing means to the papermaking machine; and (iv) a paper side surface, having predetermined cross-machine direction and machine direction profiles including fabric contacting surfaces adapted to support the forming fabric in sliding contact;

wherein the paper side surface includes a plurality of vents which begin substantially adjacent to the leading edge and end substantially adjacent to the trailing edge, and extend from the paper side surface and through the machine side surface of the impingement shoe.

In a papermaking machine having two forming fabrics, it will generally be preferable for the two impingement shoes to be the same, their profiled fabric-supporting surfaces having the same shape. However, for particular situations, the two impingement shoes, and their profiled fabric-supporting surfaces, can be of different shapes.

In addition to use as an impingement shoe, the segmented fabric support element can be adapted for use in various locations in a papermaking machine, including as a dewatering blade or a Uhle box cover.

In a third broad embodiment, the present invention seeks to provide a fabric support element, for use in a papermaking machine, having (i) a leading edge;

(ii) a trailing edge;

(iii) a machine side surface adapted to be releasably secured by a securing means to the papermaking machine; and (iv) a paper side surface having predetermined cross-machine direction and machine direction profiles including fabric contacting surfaces adapted to support a papermaker's fabric in sliding contact;

wherein (a) the element comprises a plurality of at least first and second laminar segments;

(b) the fabric contacting paper side surface profile of the first laminar segments differs from the paper side surface profile of the second laminar segments; and (c) at least some of the first and second laminar segments contribute to the predetermined profile of the fabric contacting paper side surface of the element.

In a fourth broad embodiment, the present invention seeks to provide a papermaking machine, having a machine direction and a cross-machine direction, which includes:

a papermaking fabric moving in the machine direction;

a fabric support element having (i) a leading edge;

(ii) a trailing edge;

(iii) a machine side surface adapted to be releasably secured by a securing means to the papermaking machine; and (iv) a paper side surface, having predetermined cross-machine direction and machine direction profiles including fabric contacting surfaces adapted to support the papermaking fabric in sliding contact;

wherein (a) the element comprises a plurality of at least first and second laminar segments;

(b) the paper side surface profile of the first laminar segments differs from the paper side surface profile of the second laminar segments; and (c) at least some of the first laminar segments contribute to the predetermined profile of the fabric contacting paper side surface of the element.

In a fifth broad embodiment, the present invention seeks to provide a segment, a plurality of which can be releasably secured to comprise a stationary fabric support element for supporting a moving papermaker's fabric, such that the PS surfaces of at least some of the segments contribute in the MD to a profiled PS surface of the element, and flow-through vents through the element can be defined by spaces between at least some of the segments and can be further defined by spacing means, so as to contribute to the CD and MD profile of the element.

When the fabric support element is used as an impingement shoe, it has been found advantageous for the leading edge of the flow-through vents to have a substantially convexly curved shape, and for the trailing edge of the vents to have a corresponding substantially concavely curved shape. These shapes have been found to assist in the management of the large volumes of fluid which are drained through the fabric in the impingement zone.

Further, it has been found that the construction of an impingement shoe or other stationary fabric support element from a plurality of segments enables the use of hard and abrasion resistant materials, such as ceramics, for complex shapes, without the problems associated with grinding intricate shapes or large scale casting associated with creating such shapes for a larger component.

In a sixth broad embodiment this invention seeks to provide a method of making a stationary fabric support element for supporting a moving papermaker's fabric in a papermaking machine comprising the steps of:

(i) assembling a plurality of laminar segments in a spaced apart and substantially parallel configuration, thereby defining openings between at least some adjacent pairs of the segments, the paper side surfaces of at least some of the segments defining a composite paper side surface with which the moving fabric can make sliding contact;

(ii) releasably securing the segments so that they are oriented substantially parallel, or at a small angle, to the machine direction, by a securing means to a retaining means on the papermaking machine.

The invention will now be described with reference to the attached drawings in which.

Figure 4:
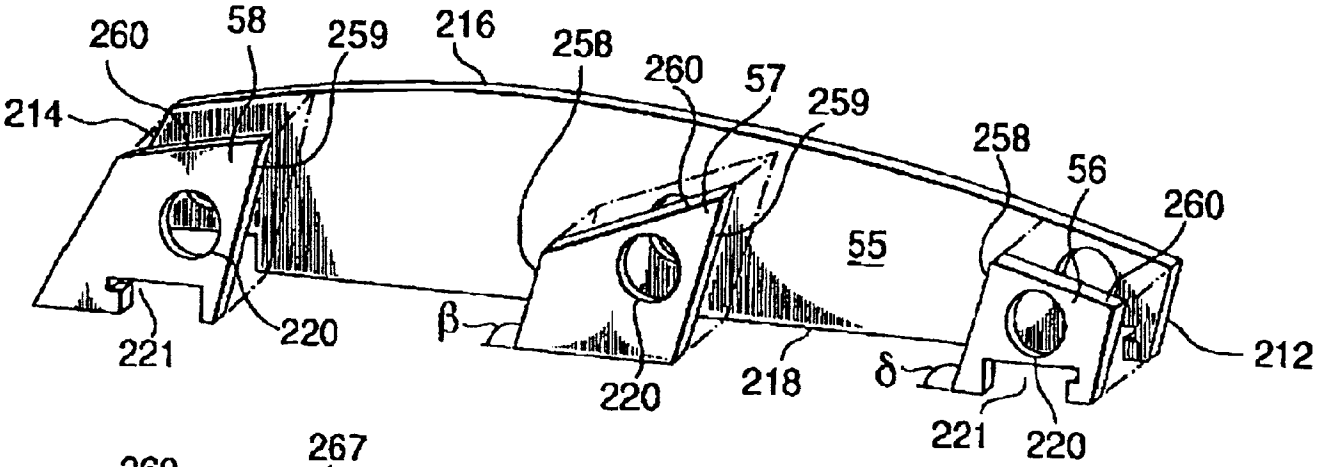
Figure 5:
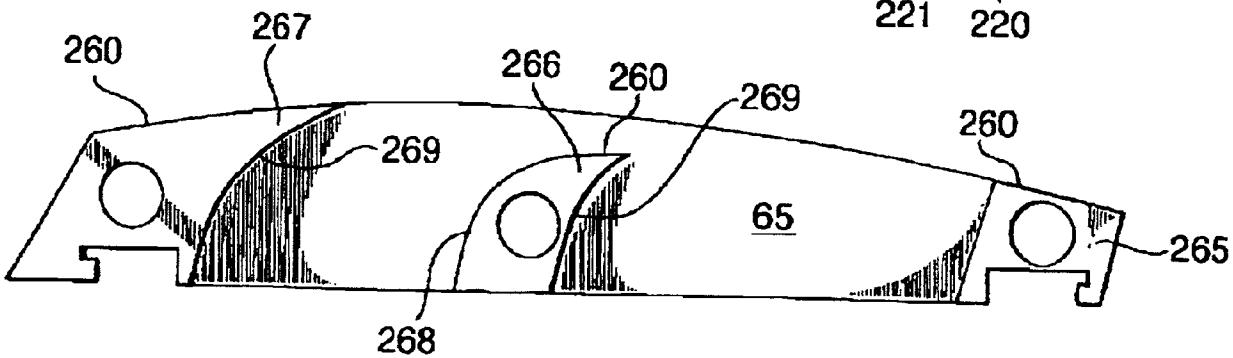
Figure 6:
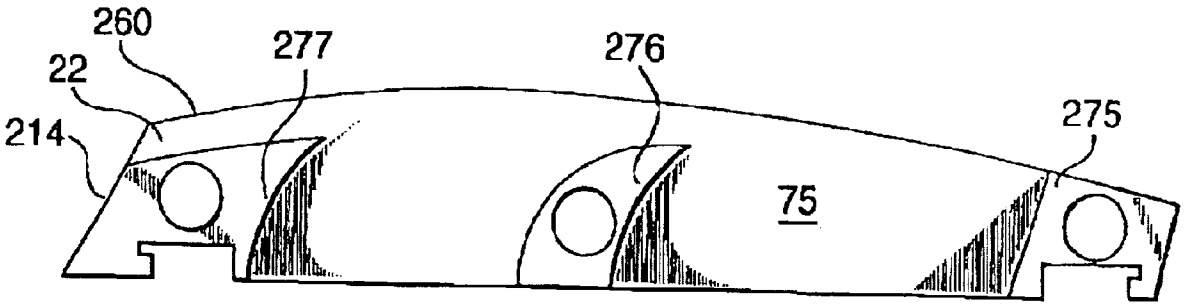
Figure 8:
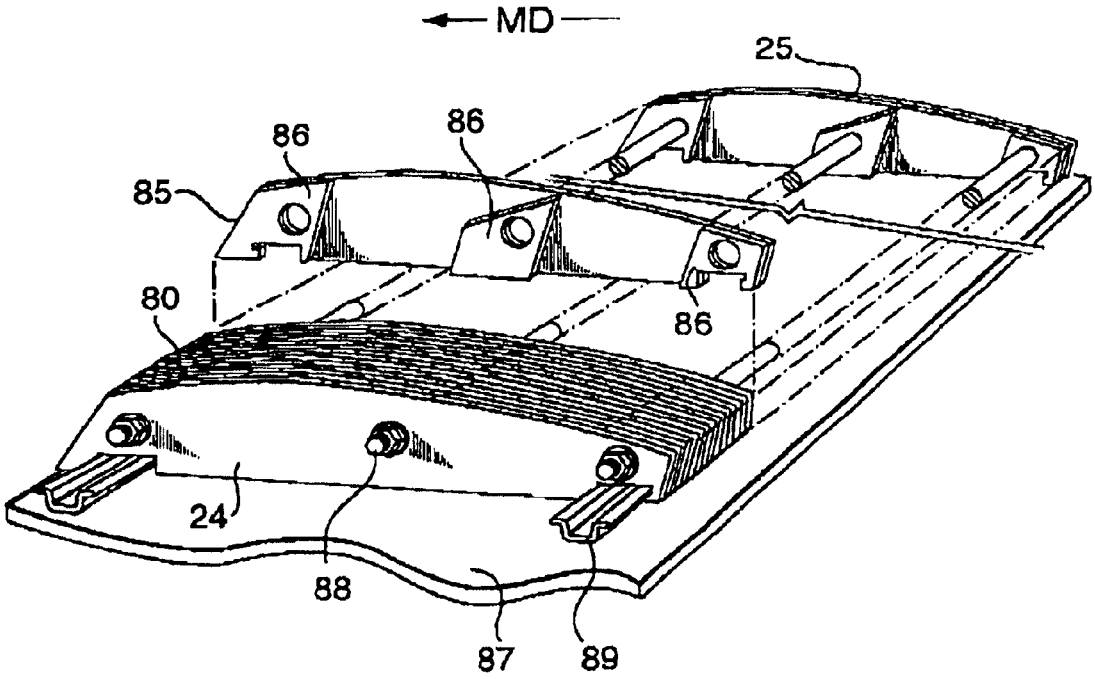
Figure 9:
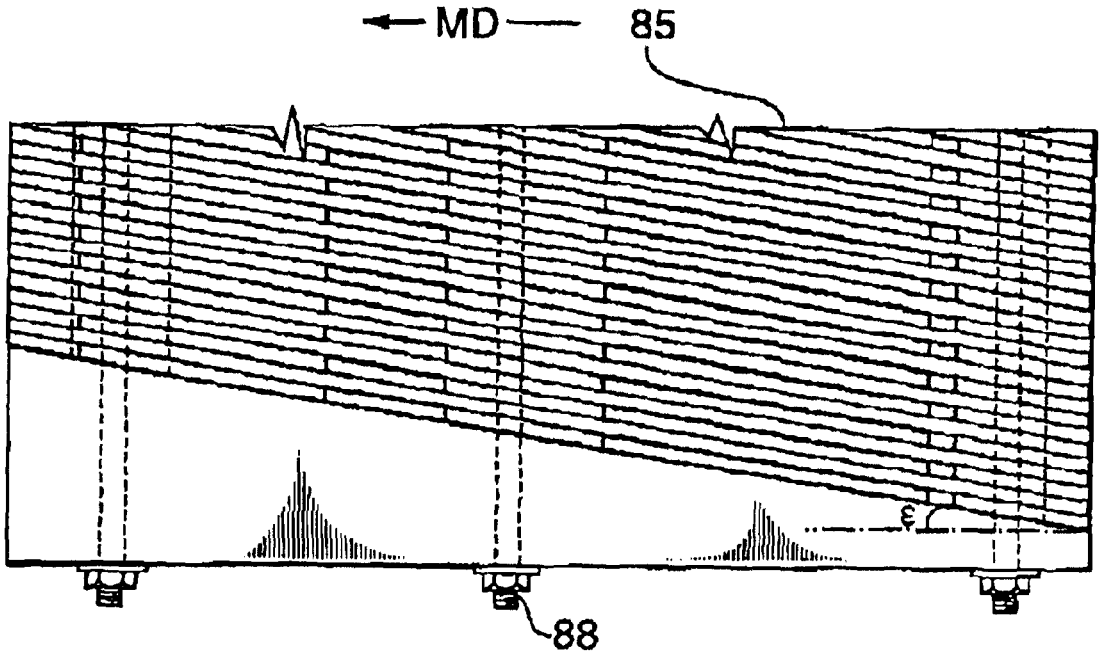

FIGS. 4, 5 and 6 respectively show a segment of each of three different embodiments of the invention;

FIG. 7 show alternative arrangements for the use of optical profiles for the laminar segments of the invention;

FIG. 8 is an isometric view of a vented stationary support element in an embodiment of the invention;

FIG. 9 is a plan view of an arrangement for the segments in an embodiment of the invention.

Figure 1:
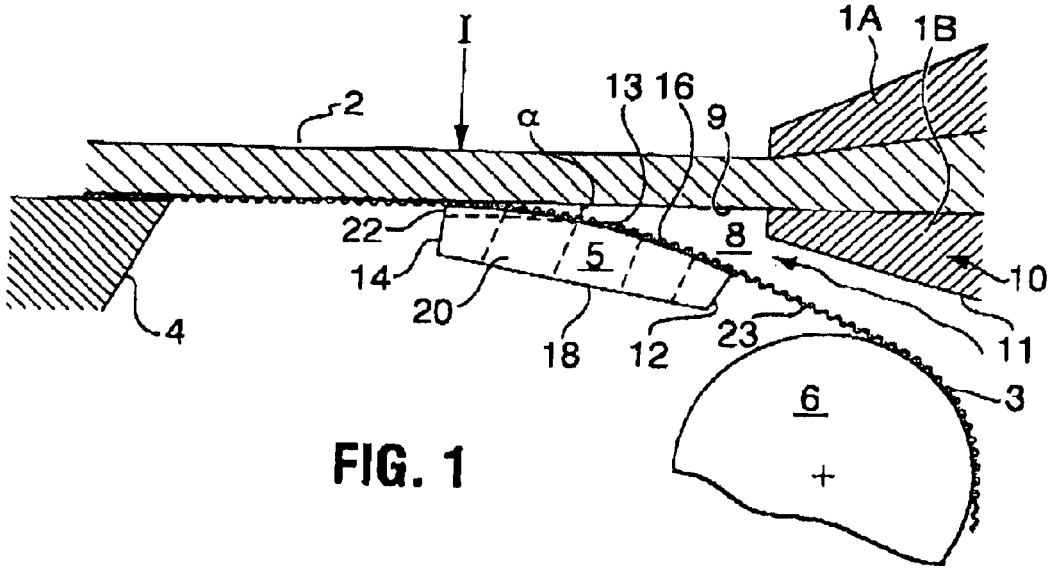
FIG. 1 shows part of an open surface papermaking machine including a vented impingement shoe.
Figure 2:
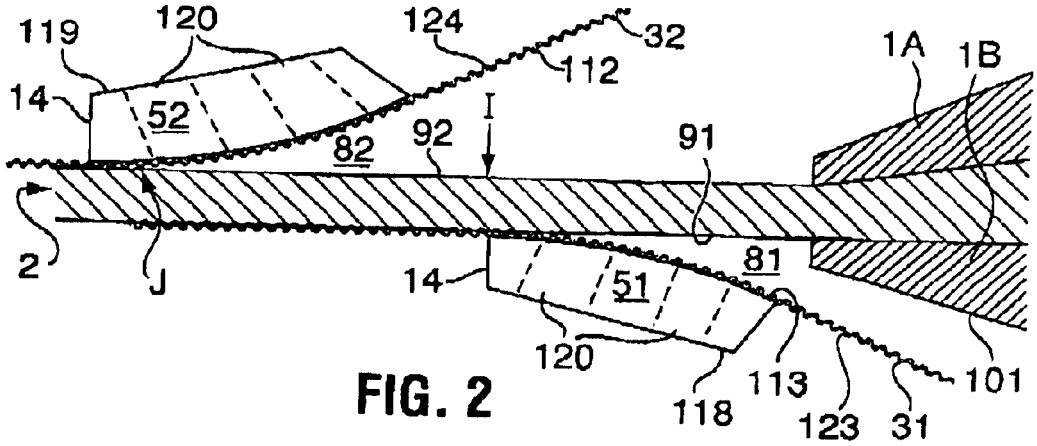
FIGS. 2 and 3 show parts of two different twin fabric papermaking machines.
Figure 3:
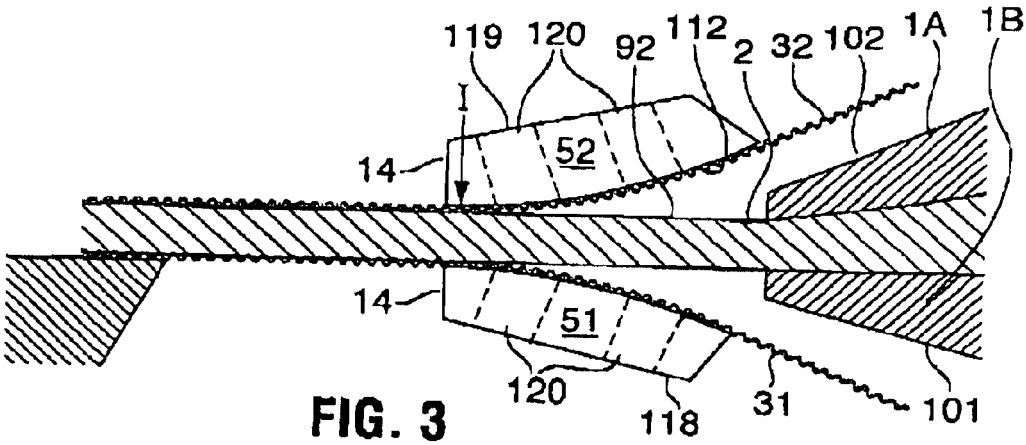

In FIGS. 1 to 3, only the parts of the papermaking machine required for an understanding of this invention are shown.

FIG. 1 shows the initial impingement zone of a paper making machine which includes a vented impingement shoe according to the teachings of this invention. The slice lips 1A and 1B of the head box 10 deliver a jet of stock 2 onto the PS surface 13 of the forming fabric 3 at the impingement point I. The forming fabric 3 passes around the roll 6, wraps the vented impingement shoe 5, and then passes over the first static support element 4 in the forming section. The impingement shoe 5 is provided with flow-through vents 20 which form slot-like openings 22 in its PS surface. The impingement shoe 5 can be assembled from a plurality of relatively thin laminar segments and releasably secured to a suitable mounting means (not shown) on a drainage box (not shown). Alternatively, the impingement shoe 5 can comprise a single unitary construction including flow-through vents 20.

As the moving forming fabric 3 and the stock jet 2 converge and meet at an angle of impingement $\alpha$, air 8 in the wedge shaped space between the lower surface 9 of the stock jet 2, the lower surface 11 of the head box lip 1B, and the PS surface 13 of the forming fabric 3 becomes trapped and enters the forming fabric 3. This air, together with some of the liquid in the forming fabric at this point, passes through the MS surface 23 of the forming fabric 3 into the flow-through vents 20, through the PS surface 16 of the impingement shoe 5, and the fluid, including the entrapped air 8, is drained out through the MS surface 18 of the vented impingement shoe 5. The various configurations and functions of the flow-through vents 20 are described in greater detail below with reference to FIGS. 4, 5 and 6. The vents 20 form openings 2, which can be slot-like as shown in FIG. 1, on the PS surface 16 of the impingement shoe 5 beginning proximate the leading edge 12 and ending proximate the trailing edge 14.

In this arrangement, as the roll 6 can be located away from the path of the forming fabric 3, and as the vented impingement shoe 5 occupies far less space than the roll 6, it is possible to maintain the angle of impingement $\alpha$ close to zero, and to reduce the unsupported length of the stock jet 2 significantly. Further, all or a substantial proportion of any entrained air 8 passes speedily along with the liquid which drains through the MS surface 18 of the vented impingement shoe 5 by means of the flow-through vents 20, and is thus prevented from interfering in the formation process within the stock in the forming section.

As is discussed in more detail below with reference to FIG. 6, the depth of the openings 22 can also be increased in the profiled PS surface 16 towards the trailing edge 14 of the vented impingement shoe 5, to allow for the removal of additional liquid and entrapped air.

FIGS. 2 and 3 show the initial impingement zone of a paper making machine which has two forming fabrics, and which incorporates two vented impingement shoes 51 and 52, according to the teachings of this invention. In describing these two Figures the terms "upper" and "lower" refer only to the orientation shown, although in practice in a twin fabric machine the forming section is often oriented vertically, or at some angle thereto. The vented impingement shoes 51 and 52 include flow-through vents 120 which form slot-like openings 122 in the PS surfaces.

FIG. 2 shows the impingement zone of a twin fabric machine in which the point of impingement I of the stock jet 2 on the lower forming fabric 31 precedes the point of contact J between the upper forming fabric 32 and the incipient web being carried on the PS surface of the lower forming fabric 31. The point of impingement I is situated at a location where the lower surface 123 of the lower forming fabric 31 is supported by vented impingement shoe 51. Similarly, the point of contact J is situated at a location where the PS surface 124 of the upper forming fabric 32 is supported by vented impingement shoe 52. As the moving forming fabric 31 and the stock jet 2 converge, air 81 in the wedge shaped space between the lower surface 91 of the stock jet 2, the lower surface 101 of the head box lip 1B, and the PS surface 113 of the forming fabric 31 becomes trapped and enters the forming fabric 31. This air 81, together with some of the liquid carried by the forming fabric 31 at this point, passes through the MS surface 123 of the forming fabric 31 into the vents 120 in the lower vented impingement shoe 51, and out through the MS surface 118. The construction as regards the lower forming fabric 31 is thus essentially the same as FIG. 1. Downstream of the impingement point I the upper forming fabric 32 converges at a point of contact J with the upper side 92 of the stock jet 2, now supported by the lower forming fabric 31. Further air is trapped in the space 82 between the PS surface 112 of the upper forming fabric 32 and the surface 92 of the stock 2. This additional air, and some of the liquid in the forming fabric 32, passes through the MS surface 124 of the forming fabric 32 into the flow-through vents 120 and is vented from the impingement shoe 52 at the MS surface 119.

FIG. 3 shows an alternative arrangement to that of FIG. 2. The arrangement of the lower forming fabric 31 is the same. The upper forming fabric 32 converges with the stock jet 2 at the same point as the lower forming fabric 31, substantially at the point of impingement I. In relation to the upper forming fabric 32, air 82 is now trapped in the space bounded by the upper surface 92 of the stock jet, the PS surface 112 of the upper forming fabric 32, and the upper surface 102 of the head box lip 1A. Substantially all of the trapped air 82, together with some of the liquid in the two forming fabrics, is vented through the flow-through vents 120 through the MS surface 118 of the lower vented impingement shoe 51 and through the MS surface 119 of the vented impingement shoe 52.

In both of these twin fabric machines, the two vented impingement shoes will often be the same, and have the same convexly curved shape. However in some circumstances it may be desirable to use two different vented impingement shoes, which may have different convexly curved shapes. Alternatively, in other circumstances, a twin fabric machine can be provided with a single impingement shoe.

The vented impingement shoes shown in each of FIGS. 1, 2 and 3 can comprise a single unitary construction, or a plurality of laminar segments mounted in substantially parallel relationship, as described in more detail below.

Referring now to FIGS. 4, 5, and 6, three different configurations of laminar segment 55, 65 and 75 respectively are shown. These are suitable for use in a vented impingement shoe 5, or for other stationary fabric support elements 80 (shown in FIGS. 8 and 9), as previously described. Referring first to FIG. 4, laminar segment 55 has a leading edge 212, a trailing edge 214, a profiled PS surface 216, and a MS surface 218. Openings 220 are provided at suitable locations in the laminar segment 55, through which a fastening means such as a rod or cable (not shown) can be passed to facilitate releasable securing of a plurality of laminar segments 55 to form an impingement shoe 5. Further mounting means for the laminar segment 55 can be provided at its lower surface 218, such as indentations 221.

The PS surfaces 216 of the laminar segments 55 support the fabric and together provide the fabric supporting PS surface 16 of the vented impingement shoe 5, as shown in FIG. 1. Similarly, the MS surfaces 218 of the laminar segments 55 together contribute to the MS surface 18 of the vented impingement shoe 5.

Between adjacent pairs of laminar segments 55, secondary segments 56, 57 and 58 are provided. These serve two purposes, firstly to provide spacing by urging apart adjacent laminar segments 55, and secondly to define the configuration of vents 20 from the PS surface 16 of the vented impingement shoe 5 through to the MS surface 18. The secondary segments 56, 57 and 58 can comprise separate segments or alternatively all or some can be constructed integrally with the laminar segments 55. As shown in FIG. 4, a vent leading edge 258 is defined by each of secondary segments 56 and 57, and a vent trailing edge 259 is defined by each of secondary segments 57 and 58. The vent leading edges 258 can be of any suitable configuration, but preferably are sloped, either regularly or irregularly in the direction towards the MS surface 218 to define an obtuse angle $\beta$ or $\delta$ with the downstream portion of the MS surface 218.

Referring to FIG. 5, laminar segment 65 has substantially the same configuration as laminar segment 55 shown in FIG. 4. However, the secondary segments 265, 266 and 267 together define substantially curved vents 20, the trailing edge 269 of the first vent 20, which is defined by second segment 266 being substantially concavely curved, and the leading edge 268 and the trailing edge 269 of the second vent 20 being respectively substantially convexly and concavely curved.

The PS surfaces 260 of the secondary segments 255, 256 and 257, or 265, 266 and 267 can have any suitable configuration. They can contribute to the fabric supporting PS surface 16 of the vented impingement shoe 5, for example as shown in relation to secondary segments 255 and 257, and 265 and 267. Alternatively, as shown in FIG. 6, the PS surface 260 of secondary segments 276 and 277 do not extend to the fabric supporting PS surface 16 of the vented impingement shoe 5, and together define an opening 22, which provides for additional drainage of liquid and entrapped air 8 at the trailing edges 214 of each laminar segment 75 which define the trailing edge 14 of the vented impingement shoe 5.

Additionally, as best understood with reference to FIGS. 7A to 7D, third laminar segments can be provided, their paper side surfaces contributing in part to the paper side surface 16 of a stationary fabric support element, and having a suitable configuration, such as a shallow 'V' so as to impart an agitation effect into the stock 2 carried on the forming fabric 3.

Figure 7A:
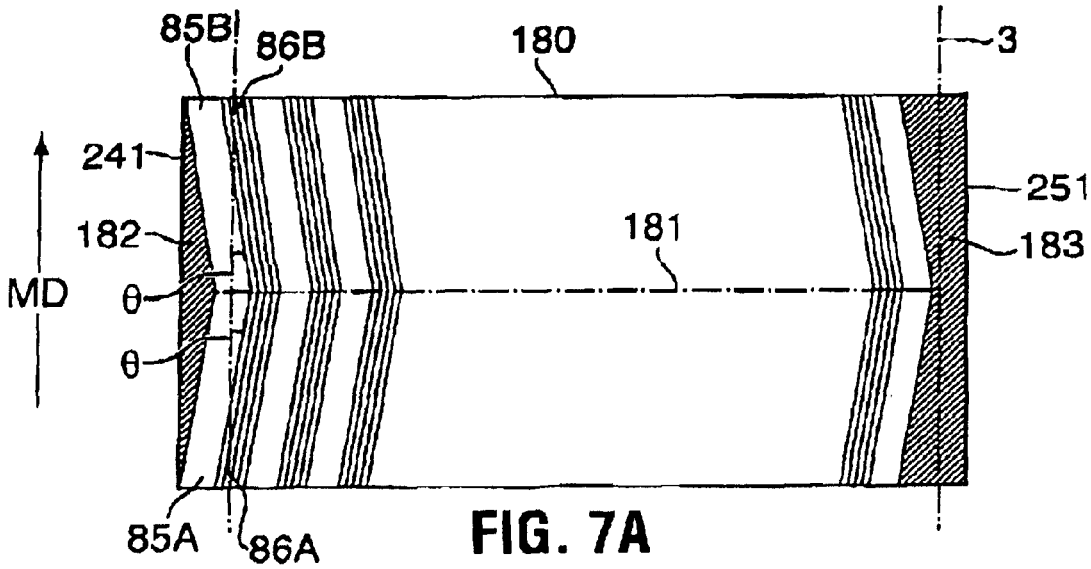

Referring to FIG. 7A, stationary fabric support element 180 comprises first and second laminar segments 85A and 85B. The first laminar segments 85A are each mounted substantially parallel to one another at a preselected small angle θ to the MD, and abut in an angled manner the similarly parallel second laminar segments 85B at a notional intersection line 181 in the CD. Between the first and second laminar segments 85A and 85B, third and fourth laminar segments 86A and 86B, each having a different PS surface profile from first and second laminar segments 85A and 85B, are mounted in like manner, being releasably secured by mounting means (not shown) to a subassembly of the element 180. End blocks 182 and 183 are provided at the lateral edges 241 and 251 of the element 180.

Figure 7B:
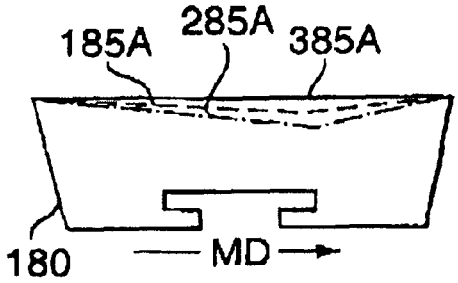

Referring to FIG. 7B, three examples of alternative constructions for the laminar segments of this embodiment are shown, illustrating differences in the PS surface. Thus, the PS surface profile of first laminar segment 185A comprises a shallow "V", the PS surface of second laminar segment 285A comprises a deeper "V", and the PS surface of third laminar segment 385A is substantially flat.

Figure 7C:
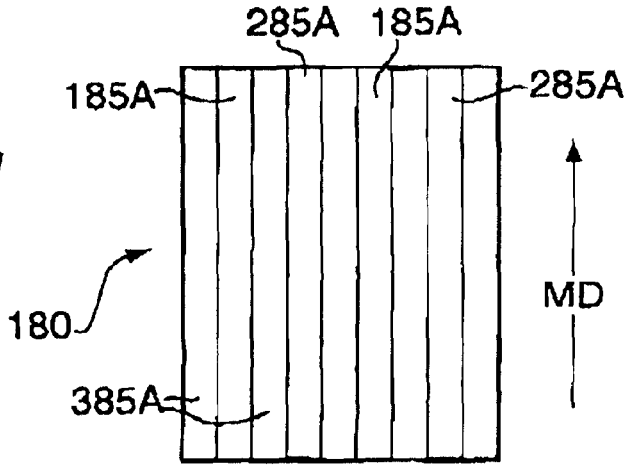

FIG. 7C shows a schematic plan view of the grouping of laminar segments for element 180 shown in FIG. 7B. In this version, laminar segments 385A are interspaced alternately with laminar segments 185A and 285A. However, third laminar segments having any of the PS surface profiles of laminar segments 185A, 285A, 385A or the like, can be used in combination with laminar segments of any of the general configurations shown in FIGS. 4, 5 or 6, depending on the intended use of the element 180.

Figure 7D:
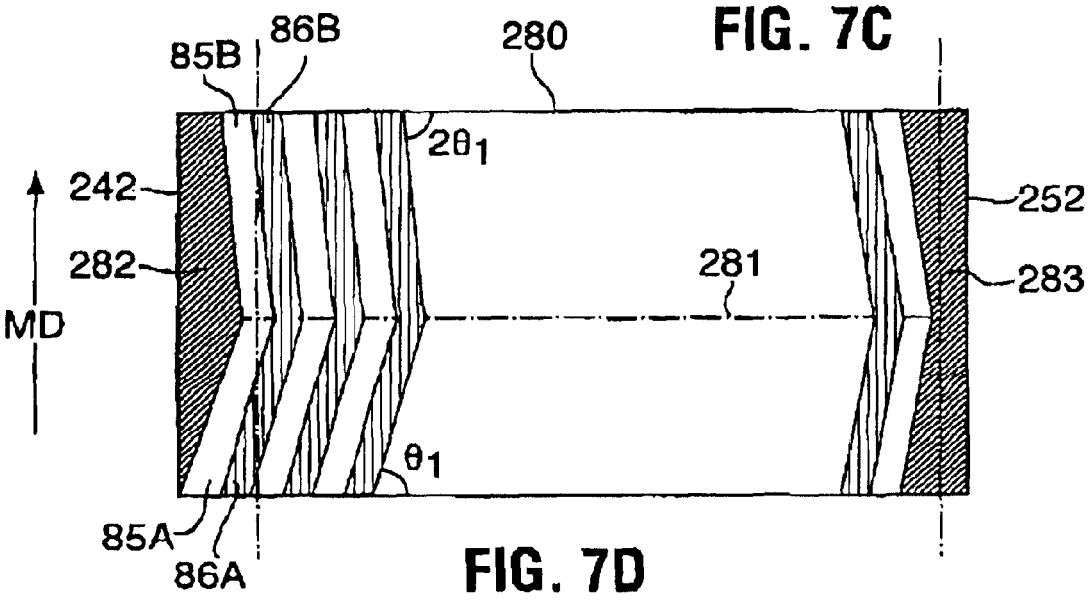

FIG. 7D shows a stationary fabric support element 280, having an alternative construction in which the leading laminar segments 85A, 86A are mounted at an angle $\theta_1$ to the CD, whereas the trailing laminar segments 85B, 86B, which abut the leading segments at notional intersection line 281 in the CD, are mounted at an angle $2\theta_1$ to the CD. End blocks 282 and 283 are provided at the lateral edges 242 and 243 respectively. Although FIG. 7D shows the use of two sets of laminar segments, it will be appreciated that laminar segments 86A and 86B can be replaced by segments having a combination of different configurations, depending on the intended use of the element 280, for example in the manner shown in the schematic view in FIG. 7C.

Referring to FIG. 8, a vented stationary fabric support element 80, for use in any of various locations in a papermaking machine, is shown in an isometric view. The element 80 comprises a plurality of laminar segments 85, which can be of any one of the configurations of laminar segments 55, 65 and 75 shown in FIGS. 4, 5 and 6 respectively, or any other suitable configuration. Selected laminar segments 85 are urged into a spaced apart relationship by second, third and fourth secondary laminar segments collectively identified as laminar segments 86, which can comprise separate segments of the configurations of secondary segments 56, 57 and 58 (FIG. 4), or 265, 266 and 267 (FIG. 5) or 275, 276, 277 (FIG. 6), or any other suitable configuration. Alternatively, as shown, the secondary segments 86 can be of any suitable configuration and be constructed integrally with the laminar segments 85. The laminar segments 85 and 86 are releasably secured by a suitable mounting means such as rods 88 and T-slot 89 to a subassembly 87 (not shown in detail), which in tun is secured to the preselected location on the papermaking machine. The rods 88 pass through the openings 220 in the laminar segments 85, to be releasably secured adjacent to the lateral edges 24, 25 of the element 80. A suitably shaped end block, such as end blocks 182, 183 shown in FIG. 7A, or end blocks 282, 283 shown in FIG. 7D, can be located at each of the lateral edges 24, 25 of the element 80 to facilitate secure placement of the laminar segments 85 in the construction of the element 80.

As can best be seen in FIG. 9, the laminar segments 85 are releasably secured in a substantially parallel relationship to each other, substantially in the MD, but at an angle ϵ thereto. This angle ϵ is preferably in the range of about 2 degrees to about 20 degrees.

In operation, a preselected number of laminar segments of the desired configuration, such as laminar segments 85, can be aligned to form a segmented fabric support element 80, and mounted as shown in FIGS. 8 and 9, to a subassembly 87, which in turn is mounted by suitable means (not shown) at the desired location on the papermaking machine, to support the papermaker's fabric at that location. The first laminar segment 85 can be separated as required by second, third and fourth laminar segments such as 56, 57 and 58 (FIG. 4), or 265, 266 and 267 (FIG. 5, or 275, 276 and 277 (FIG. 6), or by groups of other suitably shaped laminar segments. The number, shape and placement of the second or additional laminar segments will be dictated by the prevailing papermaking conditions.

The PS surface profile of element 80 can thus be shaped so as to create desired beneficial effects in the stock or nascent web carried on the fabric. For example, the PS surface can be slotted in the manner previously described, or it can have a MD profile such as a shallow "V", or it can be substantially flat. The PS shape of this surface is dictated by suitable choice of the laminar segments used to assemble the fabric support element 80. Flow-through vents 120 can be, but are not necessarily, provided.

The laminar segments 55, 65, 75 or 85 of the invention are preferably made of abrasion resistant materials such as ceramics, or high density polyethylene. If the second, third and fourth laminar segments (56, 57 and 58 and the equivalent), which are not in contact with the papermaking fabric, are not formed integrally with the laminar segments, they can readily be made of different materials from the laminar segments.

What is claimed is:

1. A vented impingement shoe, for use in a papermaking machine, located adjacent to a point of impingement of a stock jet ejected from a head box slice onto a moving forming fabric, the impingement shoe having (i) a leading edge located upstream of the point of impingement;

(ii) a trailing edge;

(iii) a machine side surface adapted to be releasably secured by a securing means to the papermaking machine; and (iv) a paper side surface, having predetermined cross-machine direction and machine direction profiles adapted to support the forming fabric in sliding contact;

wherein the paper side surface includes a plurality of vents which begin substantially adjacent to the leading edge and end substantially adjacent to the trailing edge, and extend from the paper side surface and through the machine side surface of the impingement shoe.

2. A vented impingement shoe as claimed in claim 1, wherein the plurality of vents is provided between a plurality of laminar segments having fabric contacting paper side surfaces which together contribute to the paper side surface of the impingement shoe, and are adapted to be releasably secured by a securing means and are urged into a spaced-apart relationship by spacing means.

3. A vented impingement shoe as claimed in claim 2, wherein at least some of the spacing means are constructed integrally with at least some of the laminar segments.

4. A vented impingement shoe as claimed in claim 1, wherein the plurality of vents is provided between at least a plurality of first laminar segments each of which has a fabric contacting paper side surface which contributes to the paper side surface of the impingement shoe over which the forming fabric moves, and a plurality of second laminar segments at least some of which do not include fabric contacting surfaces and are adapted to be located between selected first laminar segments, the first and second laminar segments being adapted to be releasably secured by a securing means and being urged into a spaced-apart relationship by spacing means.

5. A vented impingement shoe as claimed in claim 4, wherein each first laminar segment has a first paper side surface profile and each second laminar segment has a second paper side surface profile which differs from the first paper side surface profile.

6. A vented impingement shoe as claimed in claim 4, wherein at least some of the second laminar segments contribute substantially to the configuration of the plurality of vents.

7. A vented impingement shoe as claimed in claim 4, wherein the spacing means comprise at least some of the second laminar segments.

8. A forming section for a papermaking machine, having a machine direction and a cross-machine direction, which includes:

at least one forming fabric which moves in the machine direction;

a head box including a head box slice which provides a jet of paper making stock which impinges at an angle of impingement onto a first forming fabric at a point of impingement;

a roll, about which the first forming fabric passes, and which is located upstream of the head box slice;

a forming section, located downstream of the point of impingement, including static support elements which define a fabric path through which each forming fabric passes;

wherein at least one forming fabric is provided with a vented impingement shoe, located adjacent to the respective points at which the stock contacts each forming fabric, each impingement shoe having (i) a leading edge;

(ii) a trailing edge;

(iii) a machine side surface adapted to be releasably secured by a securing means to the papermaking machine; and (iv) a paper side surface, having predetermined cross-machine direction and machine direction profiles including fabric contacting surfaces adapted to support the forming fabric in sliding contact;

wherein the paper side surface includes a plurality of vents which begin substantially adjacent to the leading edge and end substantially adjacent to the trailing edge, and extend from the paper side surface and through the machine side surface of the impingement shoe.

9. A forming section for a papermaking machine as claimed in claim 8, wherein for each impingement shoe the plurality of vents is provided between at least a plurality of first laminar segments each of which has a fabric contacting surface which contributes to the paper side surface of the impingement shoe over which the forming fabric moves, and a plurality of second laminar segments at least some of which do not include fabric contacting surfaces and are adapted to be located between selected first laminar segments, the first and second laminar segments being adapted to be releasably secured by a securing means and being urged into a spaced-apart relationship by spacing means.

10. A forming section for a papermaking machine as claimed in claim 9, wherein each first laminar segment has a first paper side surface profile and each second laminar segment has a second paper side surface profile which differs from the first paper side surface profile.

11. A forming section for a papermaking machine as claimed in claim 10, wherein the spacing means comprise at least some of the second laminar segments.

12. A fabric support element, for use in a papermaking machine, having (i) a leading edge;

(ii) a trailing edge;

(iii) a machine side surface adapted to be releasably secured by a securing means to the papermaking machine; and (iv) a paper side surface having predetermined cross-machine direction and machine direction profiles including fabric contacting surfaces adapted to support a papermaker's fabric in sliding contact;

wherein (a) the element comprises a plurality of at least first and second laminar segments;

(b) the fabric contacting paper side surface profile of the first laminar segment differs from the paper side surface profile of the second laminar segments;

(c) at least some of the first and second laminar segments contribute to the predetermined profile of the fabric contacting paper side surface of the element; and (d) at least some of the first and second laminar segments together define a plurality of vented openings from the paper side surface through the machine side surface.

13. A fabric support element as claimed in claim 12, wherein vented openings are provided between at least a plurality of first laminar segments each of which has a fabric contacting paper side surface which contributes to the paper side surface of the impingement shoe over which the forming fabric moves, and a plurality of second laminar segments which do not contribute to the paper side surface of the impingement shoe and are adapted to be located between selected first laminar segments, the first and second laminar segments being adapted to be releasably secured by a securing means and being urged into a space-apart relationship by spacing means.

14. A fabric support element as claimed in claim 13, wherein each first laminar segment has a first paper side surface profile including a fabric contacting surface and each second laminar segment has a second paper side surface profile which differs from the first paper side surface profile.

15. A fabric support element as claimed in claim 13, wherein the spacing means comprise at least some of the second laminar segments.

16. A fabric support element as claimed in claim 13, wherein at least some of the plurality of vents further comprise V shaped notches.

17. A papermaking machine, having a machine direction and a cross-machine direction, which includes:

a papermaking fabric moving in the machine direction;

a fabric support element having (i) a leading edge;

(ii) a trailing edge;

(iii) a machine side surface adapted to be releasably secured by a securing means to the papermaking machine; and (iv) a paper side surface, having predetermined cross-machine direction and machine direction profiles including fabric contacting surfaces adapted to support the papermaking fabric in sliding contact;

wherein (a) the element comprises a plurality of at least first and second laminar segments;

(b) the paper side surface profile of the first laminar segments differs from the paper side surface profile of the second laminar segments;

(c) at least some of the first laminar segments contribute to the predetermined profile of the fabric contacting paper side surface of the element; and (d) at least some of the first and second laminar segments together define vented openings from the paper side surface through the machine side surface.

18. A papermaking machine as claimed in claim 17, wherein the first and second laminar segments are urged into a spaced-apart relationship by spacing means.

19. A papermaking machine as claimed in claim 17, wherein each first laminar segment has a first paper side surface profile and each second laminar segment has a second paper side surface profile which differs from the first paper side surface profile.

20. A papermakkng machine as claimed in claim 17, wherein the spacing means comprise at least some of the second laminar segments.

21. A laminar segment adapted to be releasably secured in a plurality thereof in a substantially parallel longitudinal relationship in a machine direction of a papermaking machine to define vented openings through a fabric support element, wherein the laminar segment has a profiled fabric contacting paper side surface, a leading edge and a trailing edge, and the profiled paper side surface can be adapted to contribute to a profiled paper side surface of the element.

22. A laminar segment as claimed in claim 21 wherein the segment is adapted to be releasably secured in a plurality thereof in a spaced-apart relationship by spacing means.

23. A laminar segment as claimed in claim 22 wherein the spacing means is integrally constructed with the segment.

24. A method of making a stationary fabric support element for supporting a moving papermaker's fabric in a papermaking machine comprising the steps of (i) assembling a plurality of laminar segments in a spaced apart and substantially parallel configuration, thereby defining vented openings between at least some adjacent pairs of the segments, the paper side surfaces of at least some of the segments defining a composite paper side surface with which the moving fabric can make sliding contact;

(ii) releasably securing the segments so that they are oriented substantially parallel, or at [a small] *an* angle *in a range of 2 degrees to 20 degrees*, to the machine direction, by a securing means to a retaining means on the papermaking machine.

*25. A vented impingement shoe as claimed in claim 2, wherein the laminar segments are releasably secured in a substantially parallel relationship to be oriented at an angle ϵ in a range of 2 degrees to 20 degrees to the machine direction.*

*26. A vented impingement shoe as claimed in claim 25, wherein at least some of the spacing means are constructed integrally with at least some of the laminar segments.*

*27. A vented impingement shoe as claimed in claim 4, wherein the first and second laminar segments are releasably secured in a substantially parallel relationship to be oriented at an angle ϵ in a range of 2 degrees to 20 degrees to the machine direction.*

*28. A vented impingement shoe as claimed in claim 5, wherein the first and second laminar segments are releasably secured in a substantially parallel relationship to be oriented at an angle ϵ in a range of 2 degrees to 20 degrees to the machine direction.*

*29. A vented impingement shoe as claimed in claim 6, wherein the first and second laminar segments are releasably secured in a substantially parallel relationship to be oriented at an angle ϵ in a range of 2 degrees to 20 degrees to the machine direction.*

*30. A vented impingement shoe as claimed in claim 7, wherein the first and second laminar segments are releasably secured in a substantially parallel relationship to be oriented at an angle ϵ in a range of 2 degrees to 20 degrees to the machine direction.*

*31. A forming section for a papermaking machine as claimed in claim 9, wherein the first and second laminar segments are releasably secured in a substantially parallel relationship to be oriented at an angle ϵ in a range of 2 degrees to 20 degrees to the machine direction.*

*32. A forming section for a papermaking machine as claimed in claim 10, wherein the first and second laminar segments are releasably secured in a substantially parallel relationship to be oriented at an angle ϵ in a range of 2 degrees to 20 degrees to the machine direction.*

*33. A papermaking machine as claimed in claim 17, wherein the first and second laminar segments are releasably secured in a substantially parallel relationship to be oriented at an angle ϵ in a range of 2 degrees to 20 degrees to the machine direction.*

*34. A papermaking machine as claimed in claim 18, wherein the first and second laminar segments are releasably secured in a substantially parallel relationship to be oriented at an angle ϵ in a range of 2 degrees to 20 degrees to the machine direction.*

*35. A papermaking machine as claimed in claim 19, wherein the first and second laminar segments are releasably secured in a substantially parallel relationship to be oriented at an angle ϵ in a range of 2 degrees to 20 degrees to the machine direction.*

*36. A papermaking machine as claimed in claim 20, wherein the first and second laminar segments are releasably secured in a substantially parallel relationship to be oriented at an angle ϵ in a range of 2 degrees to 20 degrees to the machine direction.*

* * * * *